G. H. HARRIS AND W. P. JACKSON.
FARE ZONE CHECK.
APPLICATION FILED MAR. 4, 1920.

1,356,621.

Patented Oct. 26, 1920.

INVENTORS.
GEORGE H. HARRIS
W. P. JACKSON

UNITED STATES PATENT OFFICE.

GEORGE H. HARRIS AND WILLIAM P. JACKSON, OF OAKLAND, CALIFORNIA.

FARE-ZONE CHECK.

1,356,621.  Specification of Letters Patent.  Patented Oct. 26, 1920.

Application filed March 4, 1920. Serial No. 363,117.

*To all whom it may concern:*

Be it known that we, GEORGE H. HARRIS and WILLIAM P. JACKSON, citizens of the United States, and residents of Oakland, county of Alameda, and State of California, have invented a new and useful Fare-Zone Check, of which the following is a specification.

Our invention relates to checks for indicating to passengers on vehicles, operating through predetermined zones of travel, the amount of fare to be paid on leaving the vehicle.

An object of the invention is to provide means for indicating an equitable fare based upon the length of the haul. Another object is to provide a check adapted to be given to each passenger on his boarding the car, from which he readily determines the amount of fare to be paid by him on leaving the car. Another object is the provision of a check of the character described which furnishes to the fare collector a means of recording the various amounts of fares collected by him, so that he can readily determine the total amount for which he must account to his employer.

The invention possesses other objects and features of advantage, some of which, with the foregoing, will be set forth in the following description of the preferred form of our invention which is illustrated in the drawings accompanying and forming part of the specification. It is to be understood that we do not limit ourselves to the showing made by the said drawings and description, as we may adopt variations of the preferred form within the scope of our invention as set forth in the claims.

Referring to the drawings:

Figure 1 is a plan view, showing the face of our check. Fig. 2 is a plan view showing the back of the check. Figs. 3 and 4 are face and back views respectively of another check in the system.

In terms of broad inclusion, our system contemplates the division of a passenger carrying road into zones, and the fixing of fares in accordance with the number of zones traversed by the passenger. For example, the zones may be one-half mile in length and the fare rate, three cents for the first mile, two cents for the second mile and one cent for each additional mile. For each zone through which the vehicle passes, there is a supply of checks bearing the number of that zone, and every passenger boarding the vehicle in that zone receives a check bearing the zone number. Suitable signs arranged along the right of way indicate to the passenger boarding a car the zone in which he is, so that any error in the issuance of the check may be readily detected. All the other zones in the system are listed on the check together with the fare to each from that zone in which the check was issued.

On leaving the car, the passenger notes the zone in which the car then is, either from a suitable zone indicator in the car or from the collector's announcement, and drops the required amount in the fare box, the collector checking the accuracy of the amount and taking up the check which is then punched to indicate the amount received from the holder. The figures indicating the rates are so placed on the checks that a plurality of checks received by the collector in a given zone may be superposed, one on the other, and punched at one time, and this is true irrespective of the individual or boarding zone numbers on the various checks.

From the above it will be clear that our check relieves the motorman or collector of the work of punching or tearing a check in such manner as to indicate to each passenger the zone in which he boards the car. The check is simply pulled from a pad of checks, all of which are alike in that zone, and handed to boarding passengers. It is apparent that a tremondous saving in the time necessary to load passengers is the result of our system, since a load can be taken on and a car started as fast as the passengers can walk through the gate or door. Speed in loading is of great importance in handling crowds and by eliminating the payment of fares or the tearing or punching of checks at this time, and distributing the payment of fares through the run by the use of our check, much time is saved and confusion and congestion avoided.

In detail our check comprises a sheet 2 of cheap paper, of a convenient size, preferably about two inches wide by six and one-half inches long. Preferably one side of the sheet as shown in Figs. 1 and 3 is reserved for a zone number 3 which indicates the zone in which the passenger, to whom it is issued, boards the vehicle. This number is preferably printed in large type to prominently display it and is accompanied by the word "Zone" in explanation of its significance. Instructions to the passenger and other matter, as for example, a serial number, may be also placed on the face side of the sheet, as shown in Fig. 1.

On the opposite side or back of the sheet, as shown in Figs. 2 and 4, are a series of numbers 4 arranged in columnar form under the explanatory heading "Zone." Each of these numbers designates a zone in the system and preferably the numbers begin with "1" and continue successively for as many numbers as there are zones. One or more columns may be required, two being shown in the present instance. When leaving the car the passenger refers to these zone numbers and for convenience therefore they may be designated leaving zone numbers to differentiate them from the boarding zone number on the face of the check. On all the checks in a system, and irrespective of the varying boarding zone numbers, each leaving zone number is disposed in exactly the same location, so that if a quantity of the checks are stacked together with edges even and faces in one direction the same leaving zone numbers are superposed.

By the side of the column of leaving zone numbers 4, is another column of numbers, 6, headed "Fare" and comprising numbers designating the amount of fare to be paid. These numbers are arranged in juxtaposition with the leaving zone numbers, and each number is an evaluation in terms of the fare to be paid of the distance between the boarding zone and the zone, opposite the number of which, it is placed. Thus in Figs. 1 and 2, the fare number "15" lies opposite the leaving zone numbers "30" and this indicates that for a passenger boarding the care in zone 6 and leaving it in zone 30 the fare is fifteen cents. Referring to Figs. 3 and 4, the fare number "6" is found opposite zone number "30" indicating that a fare of six cents is due from a passenger boarding the car in zone 24 and leaving it in zone 30. The two passengers, then, both leave the car in zone 30, one paying six and the other fifteen cents, or a total of twenty-one cents. The collector after seeing that the correct amounts are deposited places the checks together and punches the "Fare" column opposite "30" in the "Zone" column, the total of the fare numbers punched equaling the total sum, i. e., twenty-one cents, deposited in the fare box. The same is also true for any number of checks taken up from passengers boarding the car in different zones, but leaving in the same zone. Thus at the end of the run, the collector is in possession of a bundle of checks the total punched valuation of which should equal the total amount of money collected in fares. His accountings to his employers are thus simplified and facilitated and a convenient and accurate check on collections provided.

Additional or repeated instructions to passengers, or other matter may be placed on the back of the check as shown in Fig. 2.

It will be obvious without detailed explanation that different sizes of checks may be used and that both boarding zone number and leaving zone numbers and fare values may be disposed on one side of the sheet. We prefer the arrangement shown however, as being the simplest and most convenient.

Summing up, the fare zone check of our invention relieves the motorman or conductor of the work of punching or tearing a check when a passenger enters the car; it determines beyond dispute the point at which the passenger boarded the car and with equal certainty indicates to both passengers and collector the amount of the fare from that point to the point at which the passenger leaves the car. It also furnishes a simple means for facilitating the accounting which the collector must make to his employers.

We claim:

1. A zone check for indicating the fare to be paid by a passenger on a vehicle comprising a sheet bearing a character designating the zone in which the passenger boards the vehicle, a series of characters on said sheet designating zones in which the passenger may leave the vehicle, and a series of characters on said sheet evaluating in terms of the fare to be paid the distance between the boarding and leaving zones.

2. In a system of zone checks for indicating the fare to be paid by passengers on a vehicle, a series of checks, each one bearing a different individual character designating one of the zones of the system, a series of characters designating all the zones of the system arranged in corresponding areas on each check, and a series of characters on each check evaluating in terms of the fare to be paid, the distance between the zone designated by the individual character and the other zones of the system.

3. In a system of zone checks for indicating the fare to be paid by passengers on a vehicle, a series of checks, each one bearing a different individual character designating one of the zones of the system, a series of characters designating all the zones of the system arranged in corresponding areas on each check, and a character opposite each one of said series of characters evaluating in terms of the fare to be paid, the distance between the zone designated by it and the zone designated by said individual character.

4. A zone check for indicating the fare to be paid by a passenger on a vehicle comprising a sheet bearing on one side thereof a character designating the zone in which the passenger boards the vehicle, a series of characters on the opposite side of said sheet designating zones in which the passenger may leave the vehicle, and a series of characters arranged adjacent said zone series for indicating the fare between the boarding and leaving zone.

5. A plurality of zone checks for indicating the fares to be paid by passengers on a vehicle, each check comprising a sheet bearing a character designating the zone in which the passenger holding the same boarded the vehicle, a series of characters designating all the zones in which the passenger may leave the vehicle, and a series of characters in juxtaposition with the zone series and indicating the fare between the boarding zone and each of the leaving zones, said last named characters being disposed in corresponding areas on all of said checks whereby a plurality of said checks may be punched at one time through the characters indicating the fares paid by all the passengers leaving the vehicle in each zone.

6. A plurality of zone checks for indicating the fares to be paid by passengers on a vehicle, each check comprising a sheet bearing a number designating the zone in which the passenger holding the same boarded the vehicle, a series of numbers consecutively arranged in columnar form and designating all the zones in which the passenger may leave the vehicle, and a number opposite each zone number and indicating the fare between that zone and the boarding zone, said fare indicating numbers being disposed in corresponding areas on all of said checks whereby a plurality of said checks may be punched at one time through the numbers indicating the fares paid by all the passengers leaving the vehicle in each zone irrespective of their respective boarding zones.

In testimony whereof, we have hereunto set our hands.

GEORGE H. HARRIS.
WILLIAM P. JACKSON.